United States Patent
Imanari et al.

(10) Patent No.: US 6,253,567 B1
(45) Date of Patent: Jul. 3, 2001

(54) ICE THERMAL STORAGE TYPE AIR CONDITIONER AND ICE THERMAL STORAGE TANK

(75) Inventors: Masao Imanari, Ibaraki-ken; Toshihiko Fukushima, Tsuchiura; Sachio Sekiya, Ibaraki-ken; Katsumi Matsubara, Ushiku; Kenji Tokusa; Yoshihiko Mochizuki, both of Shizuoka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/396,878

(22) Filed: Sep. 16, 1999

(30) Foreign Application Priority Data

Sep. 17, 1998 (JP) ................................. 10-262712

(51) Int. Cl.[7] .............................. F25D 17/02; F25D 1/00
(52) U.S. Cl. ............................... 62/434; 62/430; 165/150
(58) Field of Search ........................... 62/434, 430, 59; 165/177, 163, 150, 236, 237

(56) References Cited

U.S. PATENT DOCUMENTS

| 4,365,667 | * | 12/1982 | Hatada et al. . | |
| 4,434,843 | * | 3/1984 | Alford | 165/150 |
| 5,259,214 | * | 11/1993 | Nagatomo et al. | 62/430 X |
| 5,535,820 | * | 7/1996 | Beagle et al. | 165/150 X |
| 5,540,276 | * | 7/1996 | Adams et al. | 165/150 X |

FOREIGN PATENT DOCUMENTS

| 097905 | * | 1/1984 | (EP) . |
| 569293 | * | 11/1993 | (EP) . |
| 363083590 | * | 4/1988 | (JP) . |
| 363189788 | * | 8/1988 | (JP) . |
| 110081 | | 1/1989 | (JP) . |
| 402178596 | * | 7/1990 | (JP) . |
| 405346246 | * | 12/1993 | (JP) . |
| 7332711 | | 12/1995 | (JP) . |

* cited by examiner

Primary Examiner—Michael Buiz
Assistant Examiner—Chen-Wen Jiang
(74) Attorney, Agent, or Firm—Antonelli, Terry, Stout & Kraus, LLP

(57) ABSTRACT

An ice thermal storage type air conditioner includes an outdoor unit 14 equipped with a compressor 12 and an outdoor heat exchanger 13, an indoor unit 17 equipped with an indoor heat exchanger 16 and an expansion valve 18b, and an ice thermal storage tank 5. The ice thermal storage tank is equipped with a heat exchanger exchanger used as a condenser when the accumulated heat is used. The heat exchanger has a pipe-shaped heat transfer tube 1 and a plate-shaped fin 2 installed to the heat transfer tube. The fin is installed vertically, and a plurality of rows of the heat transfer tubes and the fins are arranged.

12 Claims, 11 Drawing Sheets

ICE THERMAL STORAGE TYPE AIR CONDITIONER AND ICE THERMAL STORAGE TANK

BACKGROUND OF THE INVENTION

The present invention relates to an ice thermal storage type air conditioner in which ice making or thawing is effected by causing a refrigerant to flow in a heat transfer tube provided in an ice thermal storage tank and, more particularly, to an ice thermal storage type air conditioner suitable to increase the productivity of the ice thermal storage tank.

Conventionally, a technology has been known in which fins are provided so as to fill a clearance between heat transfer tubes forming a heat exchanger in the ice thermal storage tank, and a space that has not been used effectively for ice making is used, by which the ice packing factor is increased. Such a technology has been disclosed in JP-A-7-332711, for example. Also, JP-A-64-10081 has disclosed a technology in which a panel type ice making coil is filled in an ice thermal storage tank so that ice is made into a panel shape, by which water is prevented from being confined in the process of ice making, and the breakage of a heat transfer tube is prevented.

In the aforementioned prior art described in JP-A-7-332711, because the fins are provided in the horizontal direction of the heat transfer tube, the convection of water is hindered in the ice thermal storage tank at the time of ice making. Therefore, the confinement of water occurs, so that there is the possibility that the confined ice freezes at the time of icing and expands, resulting in the breakage of the heat transfer tube.

Also, the aforementioned prior art described in JP-A-64-10081 proposes an ice thermal storage type air conditioner opposed to an external melt type in which air conditioning is performed by circulating water at the time of thawing. For the ice thermal storage type air conditioner of a complete internal melt type in which the ice thermal storage tank is handled as a part of condenser at the time of thawing, the heat transfer tube of an ice making heat exchanger also has a high pressure. For the ice thermal storage type air conditioner using a non-azeotropic mixture refrigerant, a stronger pressure-resisting heat transfer tube is needed. For the panel type ice making coil, improper joining and corrosion of the joint portion, leakage of refrigerant, or entrance of water into a refrigerating cycle must be considered.

Further, the panel type ice making coil must be formed specially, so that the coil of this type cannot be said to be suitable for the decrease in cost. Further, it must be manufactured from the beginning so as to match the size of the ice thermal storage tank, so that there is a problem in terms of common use and flexibility, etc.

The present invention has been made to solve the problems with the aforementioned prior arts, and an object thereof is to provide an ice thermal storage tank and an ice thermal storage type air conditioner, in which the ice packing factor is increased, the leakage of refrigerant or the entrance of water into the refrigerating cycle is prevented, the reliability is enhanced even when a non-azeotropic mixture refrigerant, a natural refrigerant, or the like is used, and a low cost is achieved.

The present invention solves at least one of the aforementioned problems.

SUMMARY OF THE INVENTION

To solve the above problems, the present invention provides an ice thermal storage type air conditioner having an outdoor unit equipped with a compressor and an outdoor heat exchanger, an indoor unit equipped with an indoor heat exchanger and an expansion valve, and an ice thermal storage tank equipped with a heat exchanger therein, comprising: the heat exchanger which is used as a condenser when switching is performed to a refrigerating cycle using accumulated heat; a pipe-shaped heat transfer tube and a plate-shaped fin installed to the heat transfer tube, which form the heat exchanger; and the ice thermal storage tank in which the fin is installed vertically, and a plurality of rows of the heat transfer tubes and the fins are arranged.

Thus, since the heat transfer tube is in a pipe shape, it is highly pressure-resisting, and there is no fear of leakage of refrigerant. Also, since the plate-shaped fin is provided, a clearance between the heat transfer tubes is filled, and a space that has not been used for ice making can be used effectively. Further, since the plurality of rows of the heat transfer tubes and the fins are arranged, the ice packing factor can be increased. Also, since the fin is installed vertically, the convection of water in the ice thermal storage tank is accelerated at the time of ice making, so that the breakage of the heat transfer tube can be prevented. Further, since the heat transfer tube and the fin have only to be assembled so as to match the size of the ice thermal storage tank, this ice thermal storage type air conditioner is advantageous in common use and flexibility.

Therefore, the leakage of a refrigerant or the entrance of water into the refrigerating cycle is prevented, and the reliability can be increased even when a non-azeotropic mixture refrigerant, a natural refrigerant, or the like are used.

Also, in the above mode of the present invention, the heat transfer tube and the fin are arranged from the bottom of the ice thermal storage tank to the vicinity of the top end of the vessel.

Therefore, the size of the ice thermal storage tank can be used effectively, so that the ice packing factor can further be increased.

Further, in the above mode of the present invention, the fin has a concave portion which is a semicircular groove, and the heat transfer tube is fixed by the concave portion.

Therefore, since the fin can be manufactured easily by pressing or other methods, the cost can be kept low.

Further, in the above mode of the present invention, the heat transfer tube is bent into a bellows shape so that each row of the plurality of rows forms a series, and the fin is provided at a straight pipe portion thereof.

Further, the present invention provides an ice thermal storage type air conditioner having an outdoor unit equipped with a compressor and an outdoor heat exchanger, an indoor unit equipped with an indoor heat exchanger and an expansion valve, and an ice thermal storage tank equipped with a heat exchanger therein, comprising: the heat exchanger which is used as a condenser when switching is performed to a refrigerating cycle using accumulated heat; a flat-shaped fin which forms the heat exchanger and has a dimension in the height direction ranging from the bottom of the ice thermal storage tank to the vicinity of the top end of the vessel; a pipe-shaped heat transfer tube fixed to the fin; and the ice thermal storage tank in which the fin is installed vertically, and a plurality of fins are laminated in the thickness direction.

Thus, since the heat transfer tube is in a pipe shape, it is highly pressure-resisting, and there is no fear of leakage of refrigerant. Since the flat-shaped fin has a dimension in the height direction ranging from the bottom of the ice thermal storage tank to the vicinity of the top end of the vessel, fixes the pipe-shaped heat transfer tube, and is installed vertically, a space that has not been used for ice making can be used effectively, and the ice packing factor can be increased. Also, the convection of water in the ice thermal storage tank is accelerated at the time of ice making, so that water is not confined at the time of ice making.

Further, the present invention provides an ice thermal storage type air conditioner having an outdoor unit equipped with a compressor and an outdoor heat exchanger, an indoor unit equipped with an indoor heat exchanger and an expansion valve, and an ice thermal storage tank equipped with a heat exchanger therein, comprising: a heat transfer tube in a pipe shape of a circular cross section having an outside diameter of 7 to 9 mm; a plate-shaped fin with a thickness of 0.3 to 1.0 mm for fixing the heat transfer tube; and the ice thermal storage tank in which the fin is installed vertically, and the heat transfer tube and the fin are laminated at an interval of 10 to 50 mm, characterized in that ice is made on the surfaces of the heat transfer tube and the fin.

Since the heat transfer tube is in a pipe shape of a circular cross section having an outside diameter of 7 to 9 mm, it is highly pressure-resisting even when a non-azeotropic mixture refrigerant, a natural refrigerant, or the like are used. Since the plate-shaped fin fixes the heat transfer tube, has a thickness of 0.3 to 1.0 mm, and is laminated at an interval of 10 to 50 mm, the strength of the heat transfer tube can be secured, and the space in the ice thermal storage tank can be used effectively. Also, the ice packing factor can be increased to about 80 to 90%.

Further, the present invention provides an ice thermal storage tank which stores water therein and is provided with a heat transfer tube through which a refrigerant flows in the water, including an inlet-side header and an outlet-side header provided above the ice thermal storage tank so that they are not submerged in the water; and the heat transfer tube in a pipe shape and a plate-shaped fin provided on the heat transfer tube, the fin being installed vertically, and a plurality of rows of the heat transfer tubes and the fins being arranged.

Since the inlet-side header and the outlet-side header are provided above the ice thermal storage tank so that they are not submerged in the water, the ice packing factor can be increased still further.

Further, the present invention provides an ice thermal storage tank which stores water therein and is provided with a heat transfer tube through which a refrigerant flows in the water, including an inlet-side header and an outlet-side header provided above the ice thermal storage tank so that they are not submerged in the water; a flat-shaped fin having a dimension in the height direction ranging from the bottom of the ice thermal storage tank to the vicinity of the top end of the vessel; and the heat transfer tube in a pipe shape fixed to the fin, the fin being installed vertically, and a plurality of the fins being laminated in the thickness direction.

Further, the present invention provides an ice thermal storage tank which stores water therein and is provided with a heat transfer tube through which a refrigerant flows in the water, including an inlet-side header and an outlet-side header provided above the ice thermal storage tank so that they are not submerged in the water; the heat transfer tube in a pipe shape of a circular cross section having an outside diameter of 7 to 9 mm; and a plate-shaped fin with a thickness of 0.3 to 1.0 mm for fixing the heat transfer tube, the fin being installed vertically, and the heat transfer tube and the fin being laminated at an interval of 10 to 50 mm.

Further, in the above mode of the present invention, the fin has a concave portion which is a semicircular groove, and the heat transfer tube is fixed by the concave portion.

DESCRIPTION OF PREFERRED EMBODIMENTS

An embodiment of the present invention will now be described with reference to the accompanying drawings.

Figure 1:
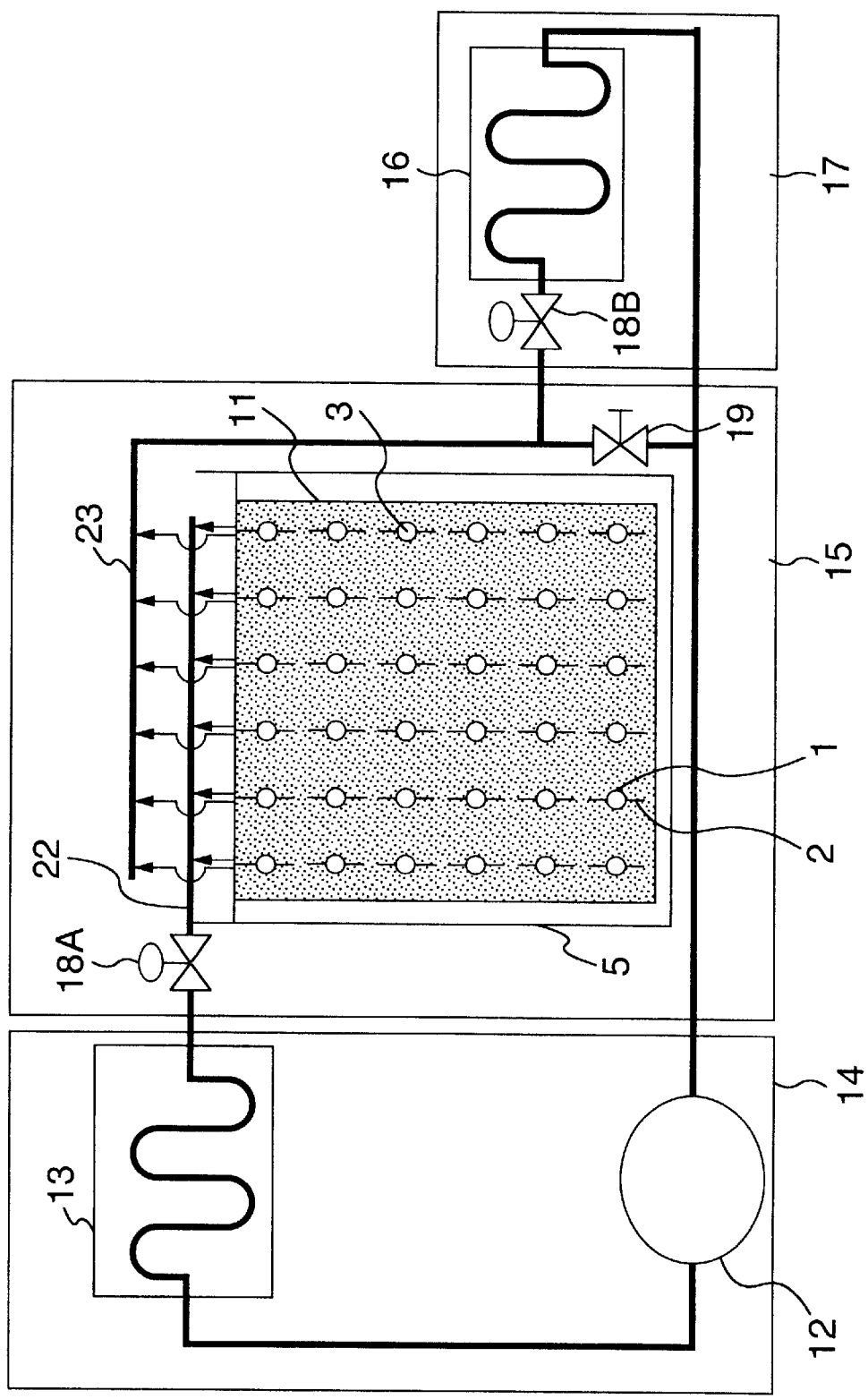
FIG. 1 is a basic schematic view of an ice thermal storage type air conditioner in accordance with one embodiment of the present invention.
Figure 2:
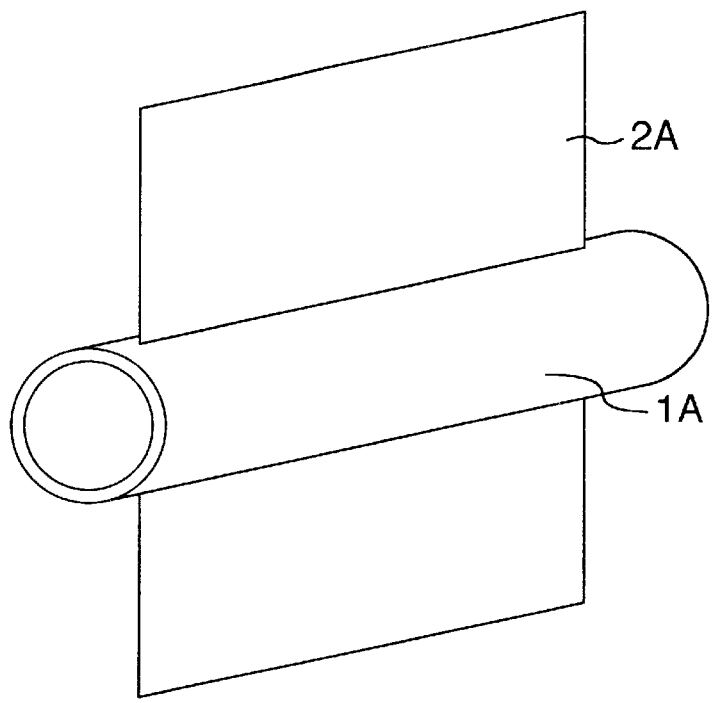
FIG. 2 is a perspective view showing a partial configuration of a heat transfer tube used for one embodiment shown in FIG. 1.
Figure 3:
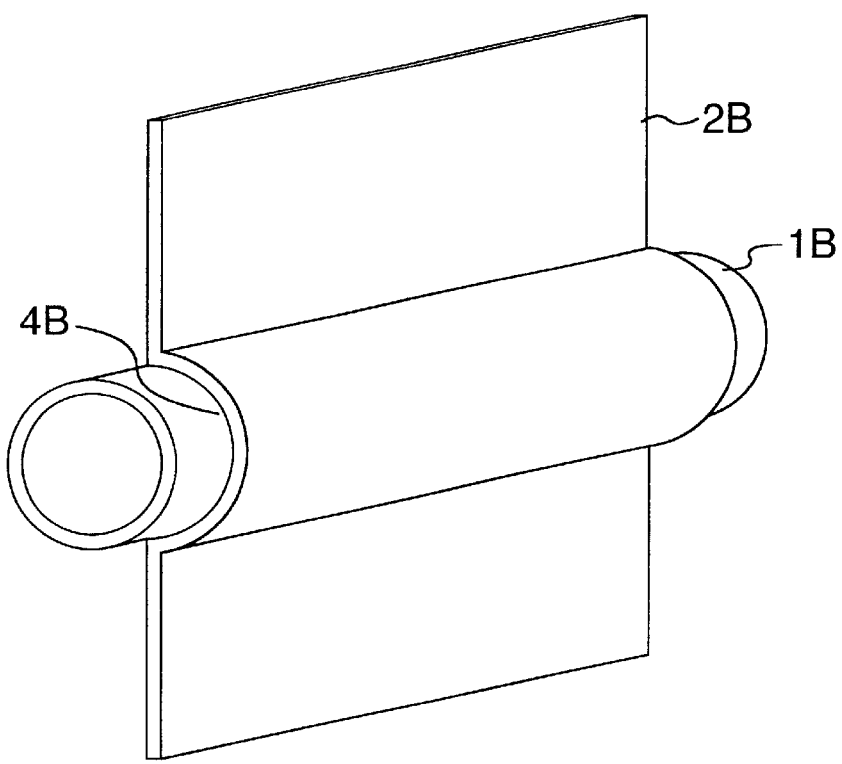
FIG. 3 is a perspective view showing a partial configuration of another embodiment of a heat transfer tube.

FIG. 1 is a basic schematic view of an ice thermal storage type air conditioner in accordance with one embodiment, and FIGS. 2 and 3 are perspective views showing a partial configuration of a heat transfer tube forming an ice making heat exchanger used for the air conditioner.

For the ice thermal storage type air conditioner, a refrigerating cycle is operated by using midnight electric power mainly at night to store cold heat as ice, and this cold heat is used for air conditioning in the daytime. When cold heat is stored in an ice thermal storage tank, by using a heat transfer tube 1 in the ice thermal storage tank 5 as an evaporator of refrigerating cycle, a low-temperature, low-pressure cooling medium is caused to flow in a heat exchanger contained in a water tank to make ice on the surface thereof, whereby cold heat is stored. For this refrigerating cycle, the medium passes through a compressor 12, an outdoor heat exchanger 13, which is a condenser, an expansion valve 18A whose opening degree is controlled, the heat transfer tube 1 in the ice thermal storage tank 5, used as an evaporator, and a valve 19, and returns to the compressor 12 through the compressor 12 and the heat exchanger 13.

When cold heat is used for air conditioning, by using the heat exchanger in the ice thermal storage tank 5 as a part of a condenser of refrigerating cycle, a high-temperature, high-pressure cooling medium is caused to flow in the heat exchanger to thaw ice 11 from the ice making surface side of the heat transfer tube 1, whereby cold heat is taken out.

Figure 20:
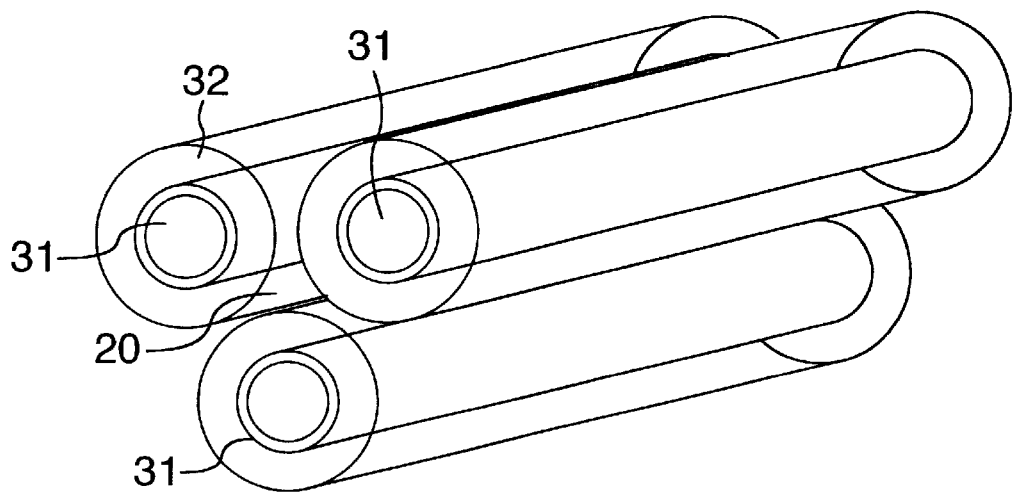
FIG. 20 is a perspective view showing a state of a conventional heat transfer tube at the time of ice making.

For the conventional heat transfer tube 31, a copper pipe (outside diameter: about 7 to 9 mm) having a circular cross section that is bent into a bellows shape is used. Therefore, the ice generated on the surface has a tube shape whose cross section is substantially circular as shown in FIG. 20, and an unused portion 20 where ice is not made is produced undesirably between the ices 32 generated by the adjacent heat transfer tubes 31 above and below and to the left and right. For this reason, the ice packing factor (volume of ice/total water quantity) is about 65%. In order to increase the ice packing factor, ice 32 with a thickness of 60 to 70 mm must be made on the surface of the heat transfer tube 31. Along with the generation of the ice 32, a thermal resistance from the heat transfer surface to the ice generation surface increases, so that the completion of ice making requires a long period of time.

If ice has been made excessively, the ices 32 growing from the adjacent heat transfer tube 31 confines water in the unused portion 20 so that the water is cut off from escape. Subsequently, therefore, the water in the unused portion 20 freezes and expands, so that there is the possibility of breaking the heat transfer tube 31.

For the ice thermal storage type air conditioner shown in FIG. 1, a plate-shaped ice making heat exchanger is used in the ice thermal storage tank of the ice thermal storage type air conditioner of an internal melt type. The heat transfer tube 1 has a pipe shape, and a plate-shaped fin 2 is provided on the heat transfer tube 1. The installation direction of the fin 2 is vertical, and a plurality of rows of heat transfer tubes 1 and the fins 2 are arranged.

Thereupon, the group of the heat transfer tubes 1 is substantially the same as a type in which plate-shaped ice making heat exchangers that are perpendicular to the bottom surface of the ice thermal storage tank 5 are arranged, so that the heat transfer area of the heat transfer tube 1 can be increased, and therefore the quantity of ice making can be increased. If the quantity of ice making is equal, the thickness of ice can be decreased because ice grows on the fin 2 as well, so that the thermal resistance of ice itself can be kept low as compared with the case where only circular tubes are arranged. Further, since the ice substantially has a plate shape, the unused portion decreases, and the ice packing factor can be enhanced.

As shown in FIG. 1, an inlet-side header 22 and an outlet-side header 23 are arranged above the ice thermal storage tank 5 so that they are not submerged in the water. Thereby, a heat transfer tube 3 can be inserted from the upper part of the ice thermal storage tank 5, so that the manufacturing property is increased. Since the inlet-side header 22 and an outlet-side header 23 are not submerged in the water, the ice packing factor can be increased. Further, since the confinement of water in the unused portion can be prevented at the time of excessive icing time, the breakage of the heat transfer tube 1 can be avoided.

Specifically, if a zigzag heat exchanger is used in a square type ice thermal storage tank (bottom area: 0.33 $m^2$, top area: 0.39 $m^2$, tank height 1.26 m), the ice packing factor is about 53% when the water level height is 1.21 m. Contrary to this, if the heat transfer tubes 1 provided with a plate-shaped fin 2 in accordance with this embodiment are filled into the ice thermal storage tank of the same size with a pitch of a plurality of rows, that is, a pitch between the plates being 25 mm (10 mm on both surfaces of the plate-shaped fin 2), the ice packing factor can be increased to about 84% with the same water level height.

For the air conditioner of an internal melt type, when the refrigerating cycle is switched to the cycle in which the heat exchanger in the ice thermal storage tank is used as a part of the condenser at the time of thawing (the time when the stored heat is used), the condenser in the ice thermal storage tank 5 has a high pressure, so that the pressure resistance becomes an essential condition. However, since the heat transfer tube 1 in accordance with this embodiment has a pipe shape in which the flow path for refrigerant is circular, and has a configuration such that this pipe shape is a skeleton, it is highly pressure-resisting, so that the reliability can be increased even when a non-azeotropic mixture refrigerant, a natural refrigerant, or the like are used.

Further, since the heat transfer tube 1 is used as the ice making heat exchanger for the ice thermal storage type air conditioner, ice is made with a thermal resistance proportional to the thickness of ice, so that the temperature of the refrigerant in the heat transfer tube 1 need not be made low like the conventional ice thermal storage type air conditioner. Therefore, the coefficient of performance (COP) of the refrigerating cycle can be made high, and the electric power consumed before a specified quantity of ice making is reached can be kept low.

Further, the heat transfer tube 1 of this embodiment can increase the reliability at the time of high pressures as compared with a plate-type heat exchanger of a joint type in which two plates are joined to form the flow path for the refrigerant.

Further, since the plate-shaped fin 2 can be manufactured easily by pressing or other methods, the heat exchanger is simplified, the manufacture is easy, and the cost can be kept low.

Further, since the fin 2 and the pipe-shaped heat transfer tube 1 have only to be assembled to each other, countermeasures for various ice thermal storage tank 5 having different sizes and shapes can be taken easily, and the parts can be used commonly.

Also, although the heat transfer tube 1 installed horizontally (the refrigerant flows in the substantially horizontal direction with respect to the bottom surface of the ice thermal storage tank) is shown in FIG. 1, the heat transfer pipe 1 may be installed vertically with respect to the bottom surface of the ice thermal storage tank.

FIG. 3 is a configuration view showing another embodiment of the heat transfer tube 1A shown in FIG. 2. In this embodiment, a plate forming the fin 2B is provided with a semicircular concave portion 4B along the outside shape of the heat transfer tube 1B at a location where the plate comes into contact with the tube 1B, by which the heat transfer tube 1B is fixed. Thereby, the contact surface between the heat transfer tube 1B and the fin 2B is increased, so that heat can be transferred more rapidly between the refrigerant flowing in the heat transfer tube 1B and the water (or the ice) outside of the heat transfer tube 1B.

Figure 4:
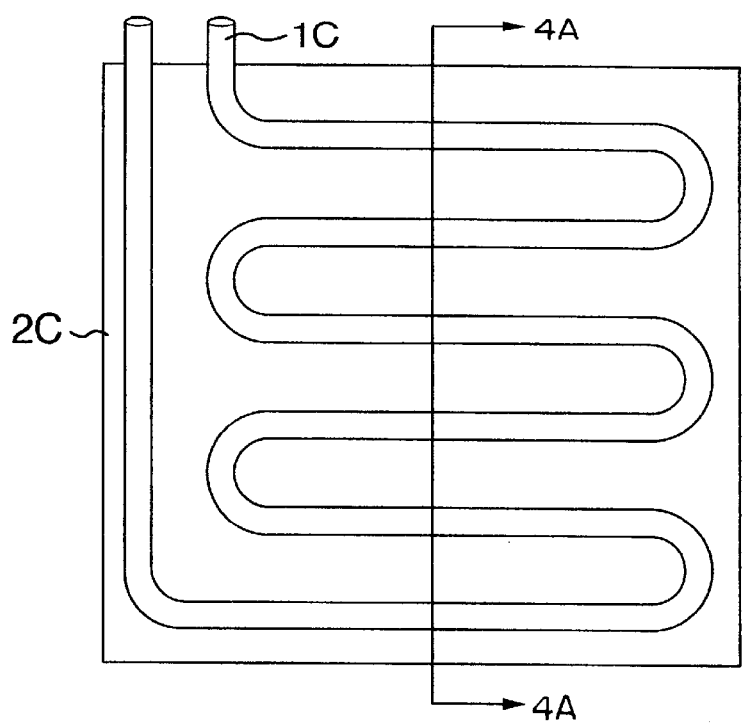
FIG. 4 is a configuration view of another embodiment of a heat transfer tube and a fin which form a heat exchanger.
Figure 4A:
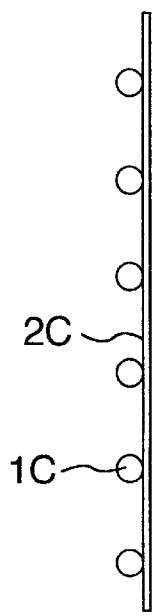
Figure 5:
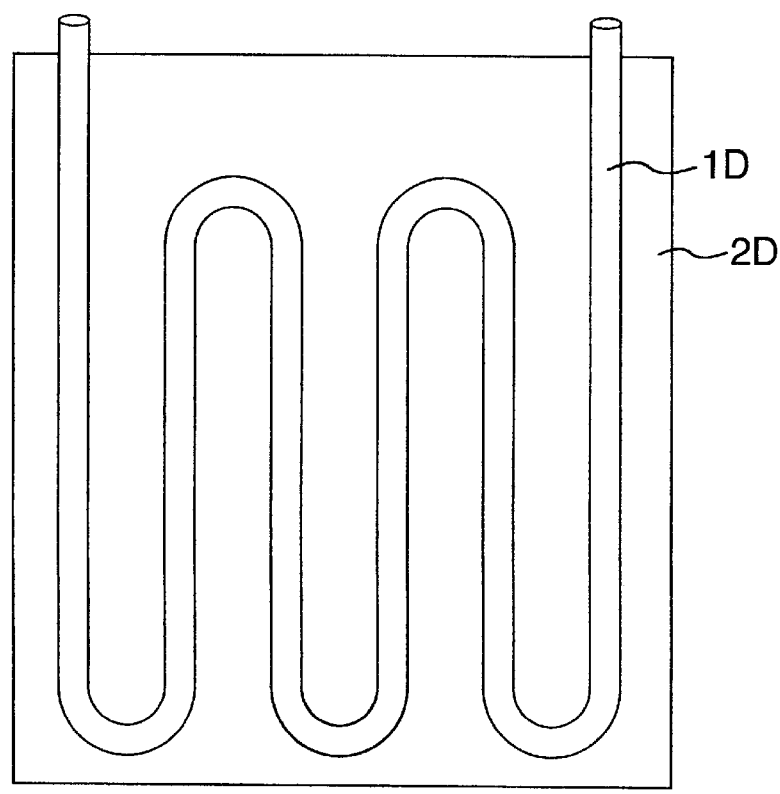
FIG. 5 is a configuration view of still another embodiment of a heat transfer tube and a fin which form a heat exchanger.

FIGS. 4 and 5 are configuration views showing other embodiments of the heat transfer tube shown in FIG. 2. In these embodiments, the fin 2C, 2D that is larger than the area occupied by one side of a pipe-shaped heat transfer tube 1C, 2D that lies in the zigzag line on one plane. FIG. 4 shows an embodiment of a zigzag tube whose straight pipe portion is horizontal, and FIG. 5 shows an embodiment of a zigzag tube whose straight pipe portion is vertical.

Thus, the fin serves functions of not only increasing the ice making performance but also increasing the rigidity of the heat transfer tube. Therefore, there is no need for providing a support member etc. for the heat transfer tube, so that the structure of heat exchanger can be simplified.

Figure 6:
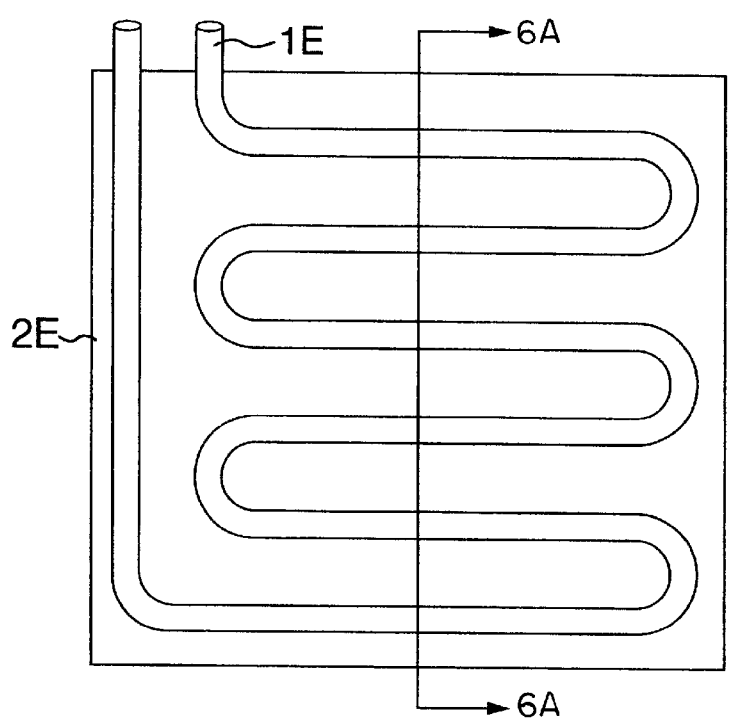
FIG. 6 is a configuration view of still another embodiment of a heat transfer tube and a fin which form a heat exchanger.
Figure 6A:
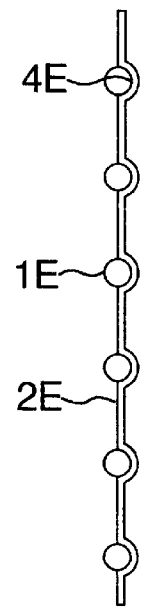

FIG. 6 is a configuration view showing another embodiment of the heat transfer tube shown in FIG. 4. In this embodiment, a plate forming the fin 2E is provided with the concave portion 4E along the outside shape of the heat transfer tube 1E at a location where the plate comes into contact with the tube 1E, by which the heat transfer tube 1E is fixed. Thereby, both performances of heat transfer property and rigidity can further be enhanced as compared with the embodiments shown in FIGS. 4 and 5.

Figure 7:
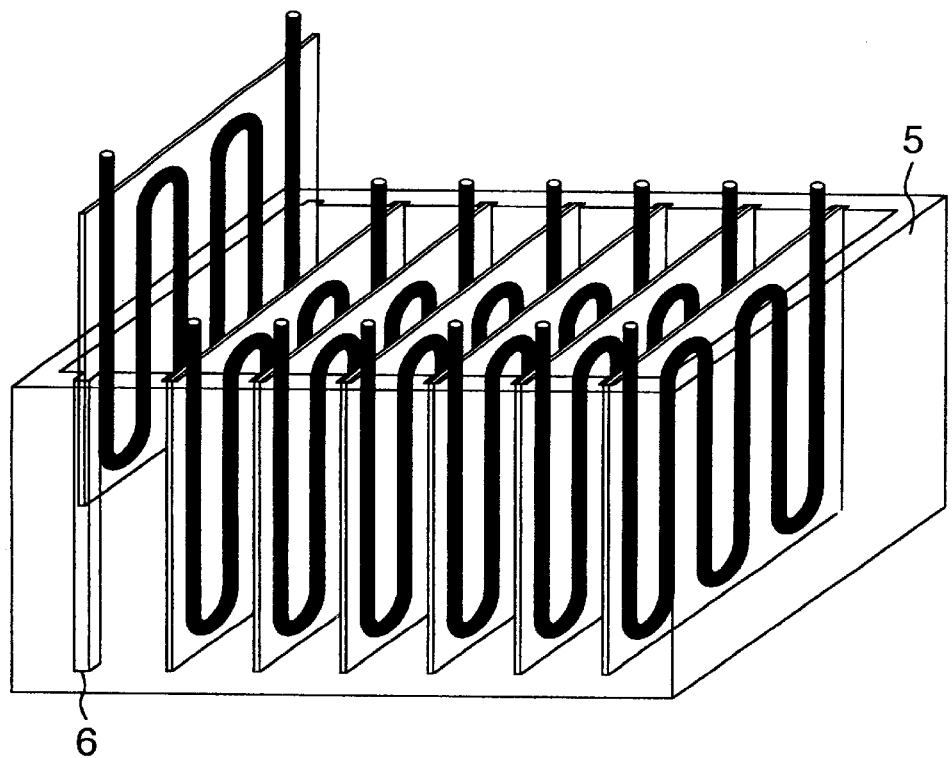
FIG. 7 is a perspective view showing a configuration of another embodiment of an ice thermal storage tank.

FIG. 7 is a configuration view of an ice thermal storage tank using the heat transfer tube shown in FIGS. 4, 5 or 6. In FIG. 7, an excess fin portion at each end of the heat transfer tube shown in FIGS. 4 to 6 is fitted into a guide portion 6 provided in the internal wall at the side of the ice thermal storage tank 5. Therefore, there is no need for specially providing a structural member etc. for supporting each of the heat transfer tubes forming the heat exchanger with a clearance provided therebetween.

Figure 8:
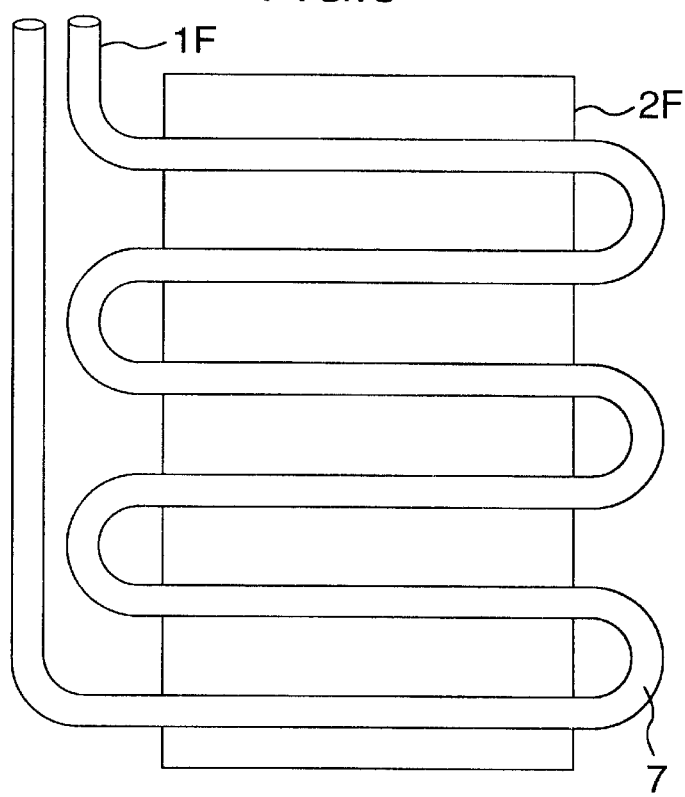
FIG. 8 is a configuration view of still another embodiment of a heat transfer tube and a fin which form a heat exchanger.

FIG. 8 is a configuration view showing another embodiment of the heat transfer tube shown in FIG. 6. In these embodiments, the fin 2F that covers the straight pipe portions excluding bent portions 7 is joined to one side of a heat transfer tube 1F that lies in the zigzag line on one plane. Therefore, when the concave portion 4 shown in FIG. 6, which is provided to join the heat transfer tube 1 to the fin 2F, is formed, the manufacture is made easy because the curved portions are omitted, which is advantageous in further reducing the cost.

Figure 9:
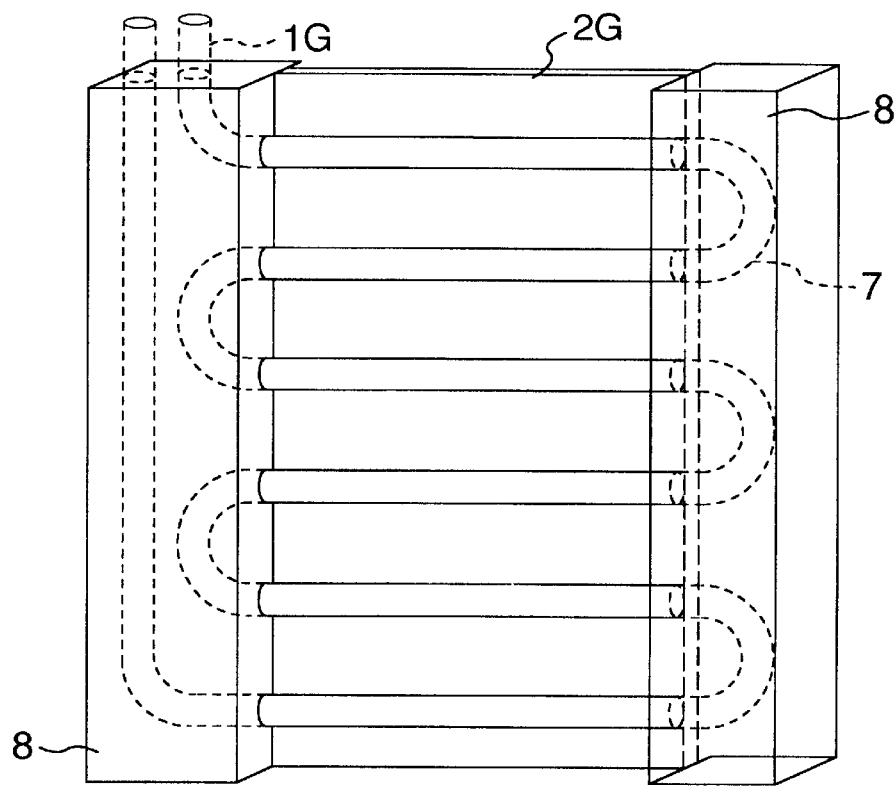
FIG. 9 is a configuration view of still another embodiment of a heat transfer tube and a fin which form a heat exchanger.

FIG. 9 is a configuration view showing another embodiment of the heat transfer tube shown in FIG. 8. In this embodiment, the bent portions 7 of the heat transfer tube 1G, which is not covered by the fin 2G, is covered by an insulating member 8. Therefore, excessive icing on the bent portions 7 can be avoided. Further, by configuring the heat transfer tube 1G so that the fins 2G are in parallel to each other and perpendicular to the bottom surface of the ice thermal storage tank 5, the thermal insulation of the side surface of the ice thermal storage tank 5 can also be effected. Although a zigzag tube whose straight pipe portion is horizontal is shown in this embodiment, for a zigzag tube whose straight pipe portion is vertical, the bent portions 7 are arranged at the bottom and top portions of the ice thermal storage tank 5, so that the insulating member 8 can be used for insulating the bottom and top portions of the ice thermal storage tank 5.

Figure 10:
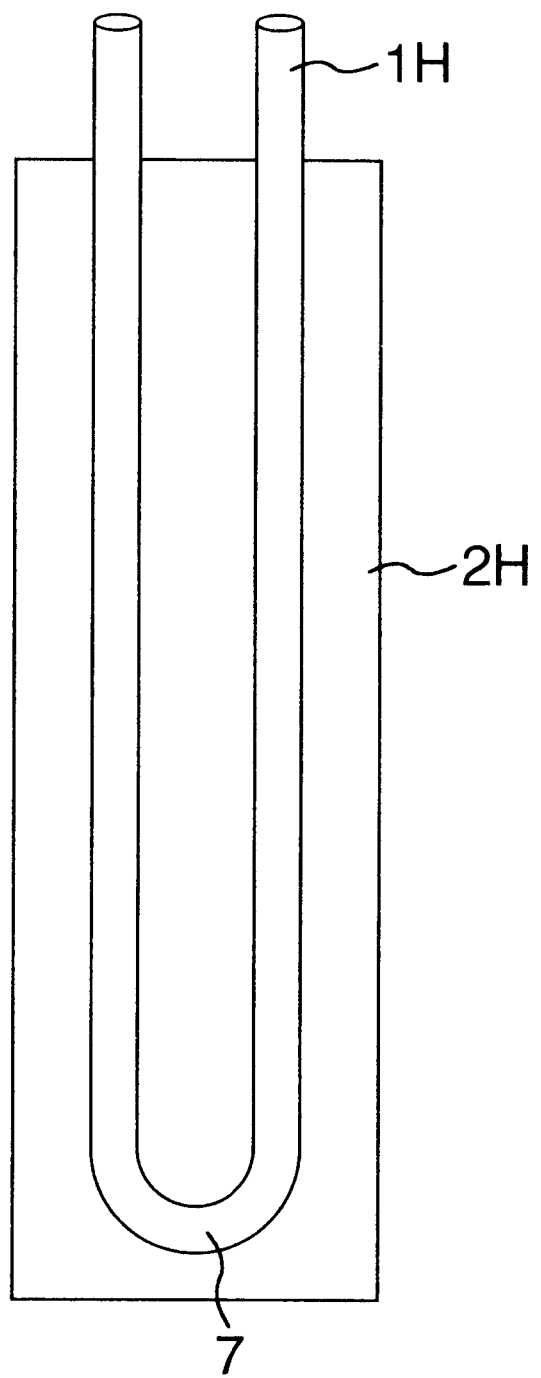
FIG. 10 is a configuration view of still another embodiment of a heat transfer tube and a fin which form a heat exchanger.
Figure 11:
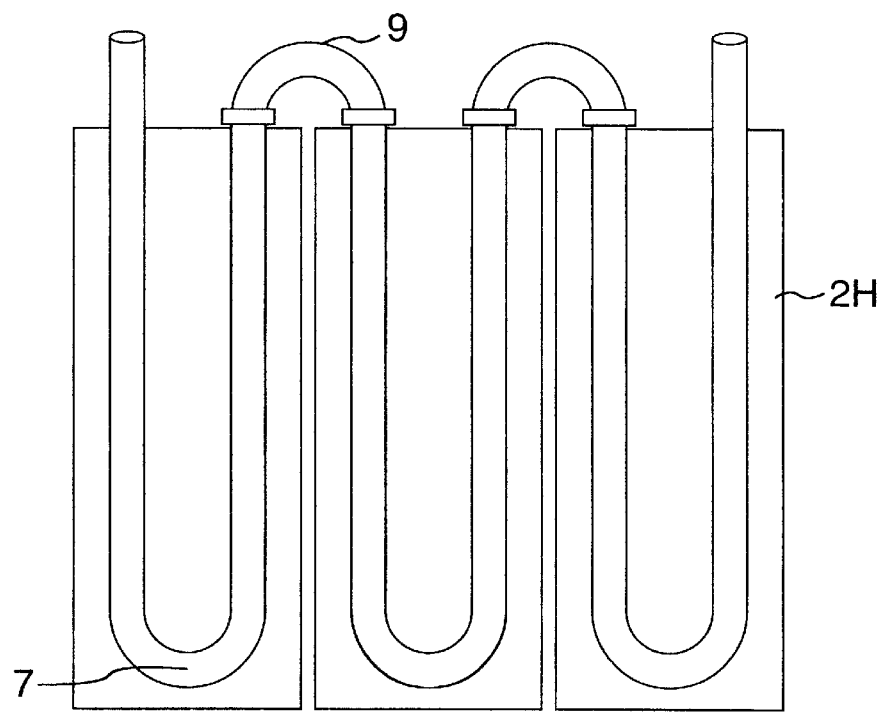
FIG. 11 is a configuration view of still another embodiment of a heat transfer tube and a fin which form a heat exchanger.

FIG. 10 is a configuration view showing another embodiment of the heat transfer tube shown in FIG. 2. In this embodiment, on one surface of a series of U-shaped heat transfer tube 1H including one bent portion 7 of the heat transfer tube 1H, a plate-shaped fin 2H is provided to cover it. As shown in FIG. 11, a heat exchanger can be assembled by combining these heat transfer tubes by mounting bents 9 in accordance with the size of various ice thermal storage tanks 5. Therefore, the heat exchanger parts can be used commonly for the ice thermal storage tanks 5 of various sizes.

Figure 12:
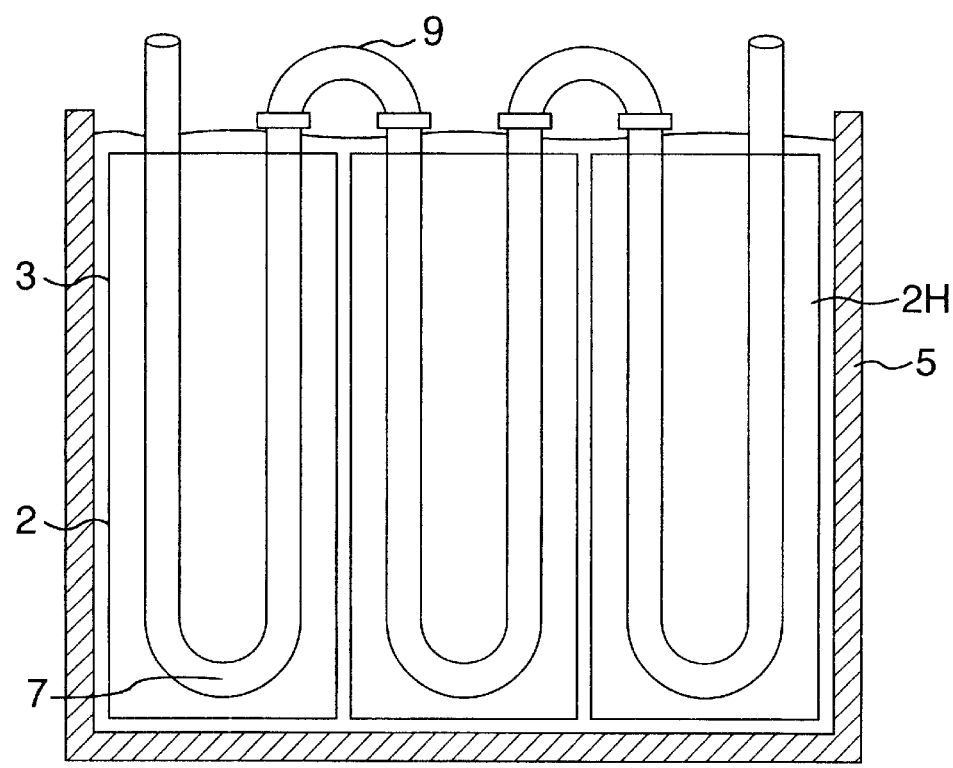
FIG. 12 is a configuration view of still another embodiment of an ice thermal storage tank.

Also, as shown in FIG. 12, the joint portions for assembling the heat transfer tubes shown in FIG. 10 together are arranged above the water level of the ice thermal storage tank 5. Thereby, troubles caused by improper joining of the joint portions, leakage of the refrigerant in the refrigerating cycle due to corrosion, or entrance of water into the cycle can be prevented, so that the reliability can be increased further.

Figure 13:
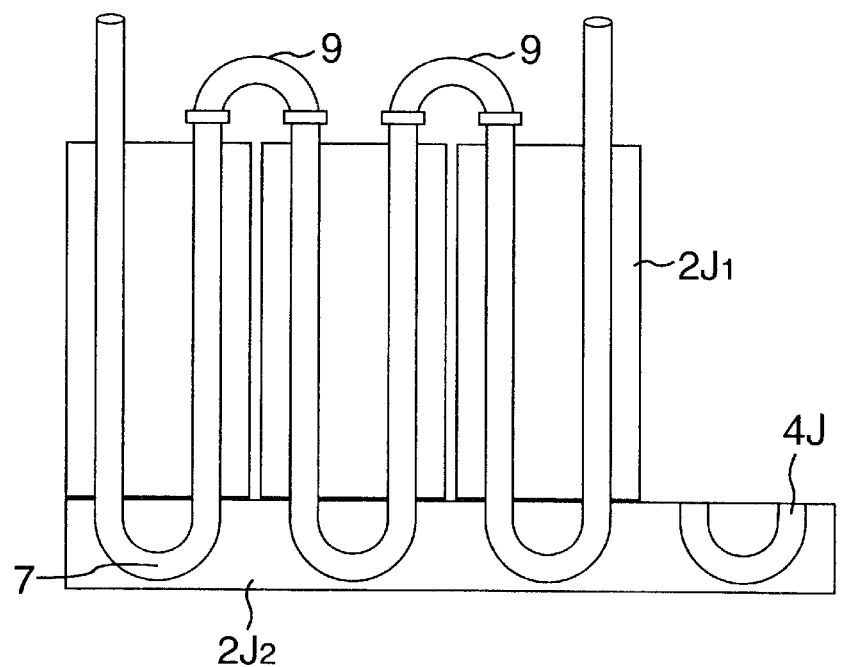
FIG. 13 is a configuration view of still another embodiment of a heat transfer tube and a fin which form a heat exchanger.

FIG. 13 is a configuration view of another embodiment in which the combination of the heat transfer tubes shown in FIG. 10 is changed. In this embodiment, a plurality of heat transfer tubes, in which the bent portions 7 are not covered by the plate-shaped fin 2J1 and are exposed, are installed and joined by the mounting bents 9, and are newly covered by a fin 2J2 that covers only the exposed bent portions 7. Thereby, excessive icing on the bent portion 7 can be prevented. Also, the fin 2 for the bent portion 7, which requires fabrication of complex shape such as drawing matching the bent shape of the heat transfer tube, can be fabricated continuously by being separated from the straight pipe portion, so that the productivity can also be improved.

Figure 14:
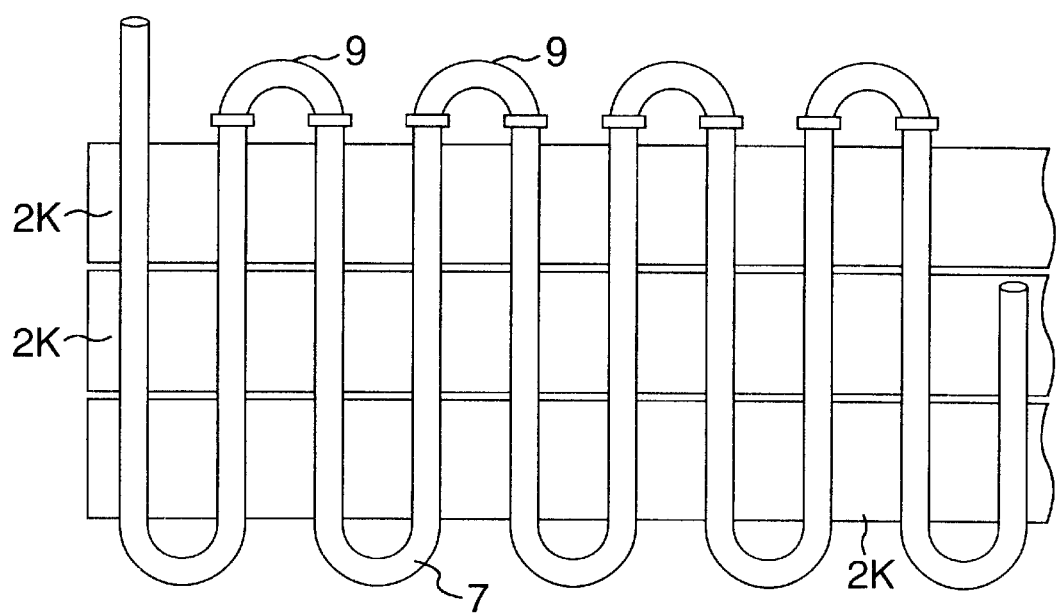
FIG. 14 is a configuration view of still another embodiment of a heat transfer tube and a fin which form a heat exchanger.

FIG. 14 is a configuration view showing another embodiment of the heat transfer tube shown in FIG. 2. In this embodiment, a band-shaped fin 2K is fixed at least by being touched so as to be held between a plurality of paths of straight pipe portions or all paths of straight pipe portions of a series of heat transfer tubes. If the band-shaped fin 2K is configured so that a plurality of fins having a width smaller than the length of the straight pipe portion of the heat transfer tube are combined, countermeasures can be taken easily for the ice thermal storage tank 5 with a different depth by changing the length of the straight pipe portion of the heat transfer tube and the number of the band-shaped fins 2K. Therefore, this embodiment is advantageous in decreasing the cost by the common use of parts.

Figure 15:
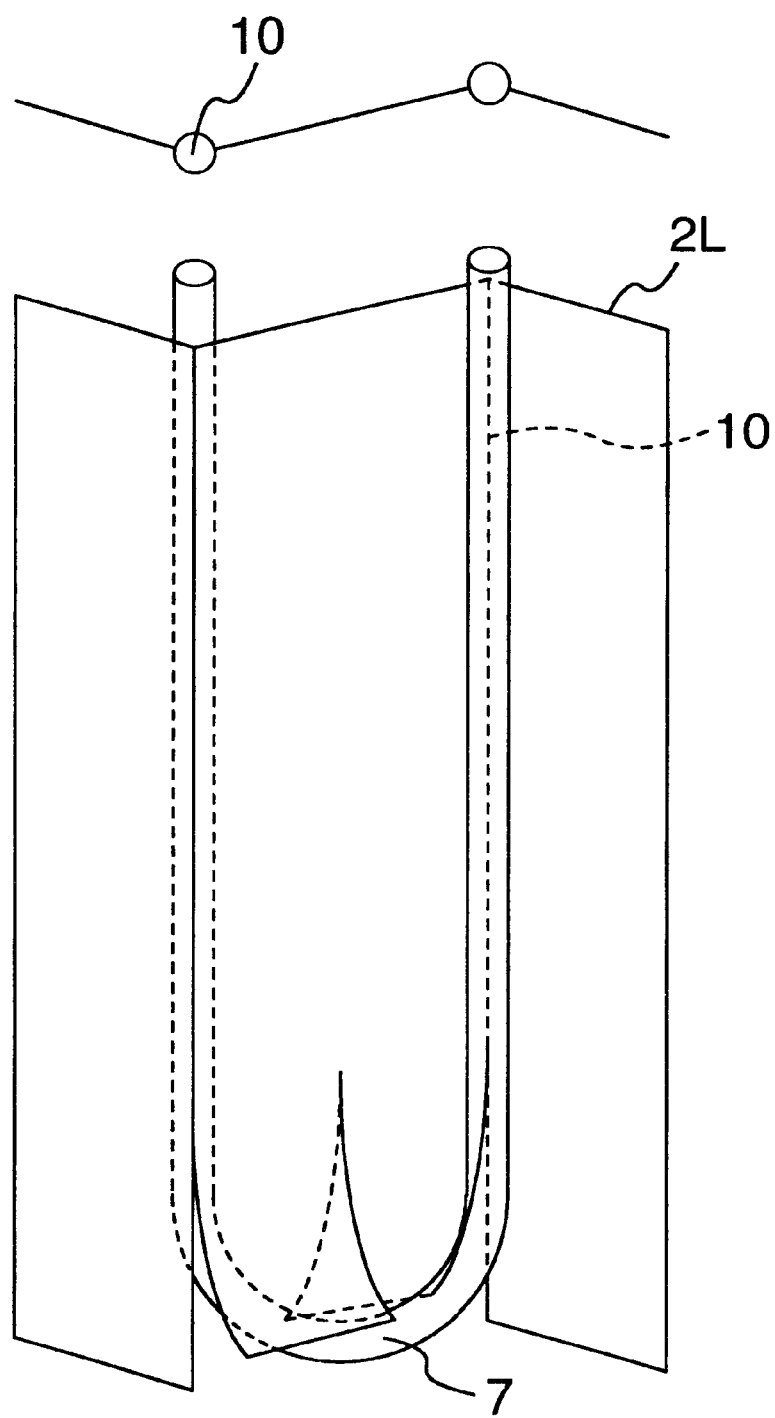
FIG. 15 is a configuration view of still another embodiment of a heat transfer tube and a fin which form a heat exchanger.

FIG. 15 is a configuration view showing another embodiment of the heat transfer tube shown in FIG. 10. In this embodiment, a valley portion 10 formed when the fin 2L itself is bent is substituted for the concave portion 4 of the fin in which the pipe is accommodated. At the bent portion 7, a cut is made in the fin 2L and the bent portion 7 is put between the fins. This embodiment is advantageous in decreasing the cost.

Figure 16:
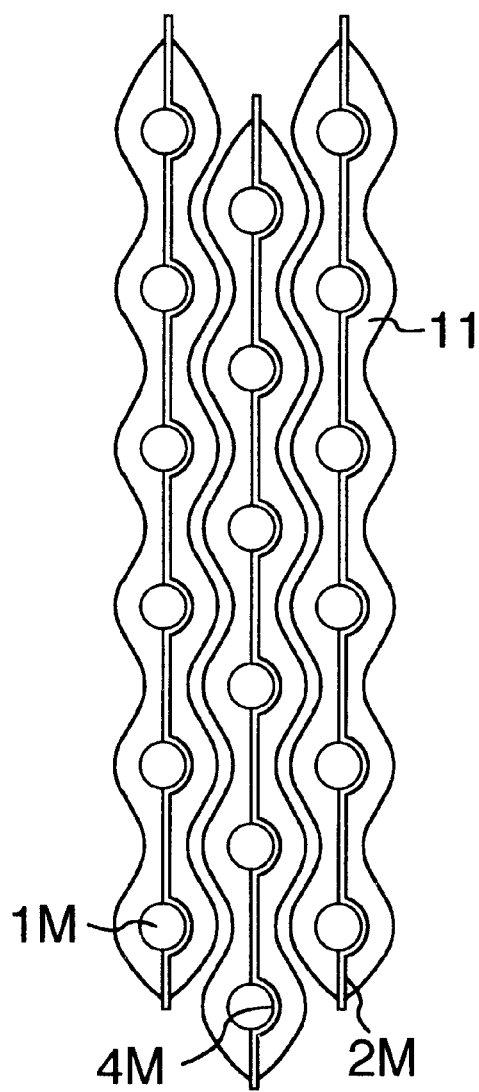
FIG. 16 is an arrangement view showing a state in which heat transfer tubes and fins in accordance with another embodiment are contained in an ice thermal storage tank.

FIG. 16 shows another embodiment of an arrangement of the heat transfer tubes 1M in the ice thermal storage tank 5. In this embodiment, the heat transfer tubes 1M are arranged in a zigzag form in the height direction of the ice thermal storage tank 5. Thereby, the number of filled heat transfer tubes in the thickness direction of the fin 2M can be increased as compared with an arrangement in a checkerboard form, so that the packing factor of ice 11 can be increased.

Figure 17:
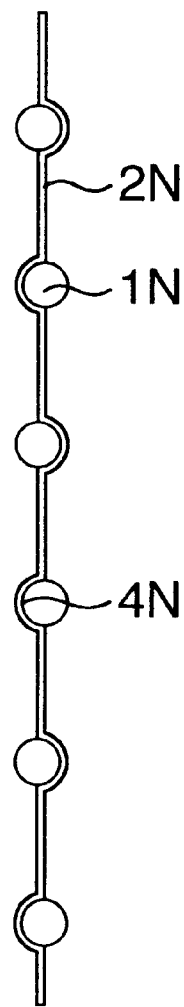
FIG. 17 is a configuration view of still another embodiment of a heat transfer tube and a fin which form a heat exchanger.

FIG. 17 is a configuration view showing another embodiment of a method for fixing the fin 2N to the heat transfer tube 1N. In this embodiment, the concave portions 4N of the plate-shaped fin 2N for fixing the heat transfer tube IN are formed alternately on the surface side and the back side of the fin 2N, by which the surface to which the heat transfer tube 1N is fixed is made alternate. Thereby, the deformation caused by fabrication when the concave portion 4N is formed and the weight distribution of the heat transfer tubes IN can be made uniform apparently, so that the rigidity of the heat exchanger can be increased.

Figure 18:
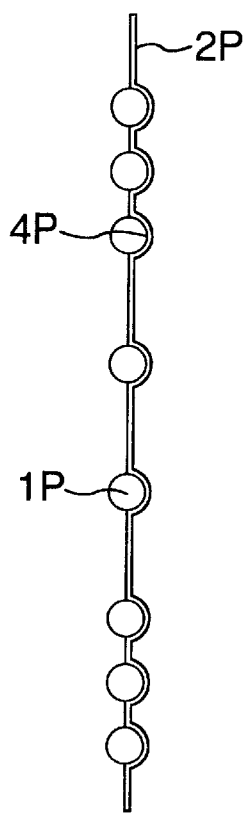
FIG. 18 is a configuration view of still another embodiment of a heat transfer tube and a fin which form a heat exchanger.

FIG. 18 is a configuration view showing another embodiment of a method for fixing the fin to the heat transfer tube. In this embodiment, when the straight pipe portion of the heat transfer tube 1P is installed horizontally, the heat transfer tubes 1P are arranged more densely at both end portions of plate than at the central portion. When the pipes are arranged uniformly, at the time of ice making, the cross section of ice 11 easily has a streamline shape such as to be thinner at both ends due to natural convection of surrounding water. According to this embodiment, ice 11 can be made more easily at both ends because cold heat is distributed densely to both end portions of the plate. Therefore, the apparent cross-sectional thickness of the ice 11 can be made uniform, so that the space factor at the local portions at the upper and lower parts of the ice thermal storage tank can be increased.

Figure 19:
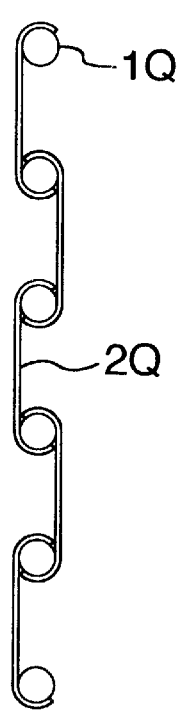
FIG. 19 is a configuration view of still another embodiment of a heat transfer tube and a fin which form a heat exchanger.

FIG. 19 is a configuration view showing another embodiment of the heat transfer tube shown in FIG. 2. In this embodiment, the half peripheral surface of the outside surface of the heat transfer tube 1Q is fixed by the end portion of the plate-shaped fin 2Q from two directions so as to be wrapped. Thereby, the contact area between the heat transfer tube 1Q and the fin 2Q can be increased, and therefore heat is transferred to the fin 2Q more rapidly, so that the ice making time can be shortened when a specified quantity of ice is made.

A clearance (pipe pitch) between the straight pipe portions of the heat transfer tubes 1Q should be 20 to 400 times the plate thickness of the fin 2Q in terms of ice making capability, preferably being 30 to 50 times.

According to the present invention, since the heat transfer tube is in a pipe shape, and therefore is highly pressure-resisting, the plate-shaped fin is provided, and a plurality of rows of heat transfer tubes and fins are arranged, a space between the heat transfer tubes can be used effectively, so that the ice packing factor can be increased. Also, since the fin is installed vertically, the convection of water in the ice thermal storage tank is accelerated at the time of ice making, so that the breakage of the heat transfer tube can be prevented. Therefore, an ice thermal storage type air conditioner and an ice thermal storage tank can be provided which have improved reliability even when a non-azeotropic mixture refrigerant, a natural refrigerant, or the like is used.

Also, according to the present invention, since the heat transfer tube is in a pipe shape, there is no fear of leakage of refrigerant. Since the flat-shaped fin, having a dimension in the height direction ranging from the bottom of the ice thermal storage tank to the vicinity of the top end of the vessel, is installed vertically, an ice thermal storage type air conditioner and an ice thermal storage tank can be provided in which the convection of water in the ice thermal storage tank is accelerated at the time of ice making, and water is not confined at the time of ice making.

Further, according to the present invention, since the heat transfer tube is in a pipe shape of a circular cross section having an outside diameter of 7 to 9 mm, the heat transfer tube is highly pressure-resisting even when a non-azeotropic mixture refrigerant, a natural refrigerant, or the like is used.

Since the plate-shaped fins having a thickness of 0.3 to 1.0 mm are laminated at intervals of 10 to 50 mm, an ice thermal storage type air conditioner and an ice thermal storage tank can be provided in which a space in the ice thermal storage tank is used effectively, and thereby the ice packing factor is increased to about 80 to 90%.

What is claimed is:

1. An ice thermal storage type air conditioner having an outdoor unit equipped with a compressor and an outdoor heat exchanger, and indoor unit equipped with an indoor heat exchanger and an expansion valve, and an ice thermal storage tank which stores water therein and is provided with a heat exchanger, comprising:

said heat exchanger which is used as a condenser when switching is performed to a refrigerating cycle using accumulated heat;

an inlet-side header and outlet side header provided above the ice thermal storage tank so that thev are not submerged in the water;

a pipe-shaped heat transfer tube which forms said heat exchanger;

a plate-shaped fin connected to only one side of said heat transfer tube; and said ice thermal storage tank in which said fin is installed vertically, and a plurality of rows of said heat transfer tubes and said fins are arranged.

2. The ice thermal storage type air conditioner according to claim 1, wherein said heat transfer tube and fin are arranged from the bottom of said ice thermal storage tank to the vicinity of the top end of the vessel.

3. The ice thermal storage type air conditioner according to claim 1, wherein said fin has a concave portion which is a semicircular groove, and said heat transfer tube is fixed by said concave portion.

4. The ice thermal storage type air conditioner according to claim 1, wherein said heat transfer tube is bent into a bellows shape so that each row of said plurality of rows forms a series, and said fin is provided at a straight pipe portion thereof.

5. The ice thermal storage type air conditioner according to claim 1, wherein said fin has a dimension in the height direction ranging from the bottom of said ice thermal storage tank to the vicinity of the top end of the vessel, is installed vertically, and a plurality of fins are laminated in the thickness direction.

6. The ice thermal storage type air conditioner according to claim 1 wherein said heat transfer tube has an outside diameter of 7 to 9 mm, said fin has a thickness of 0.3 to 10 mm, is installed vertically, and said heat transfer tube and said fin are laminated at an interval of 10 to 50 mm.

7. The ice thermal storage type air conditioner according to claim 1, wherein each row of fins and a longitudinal axis of an adjacent row of heat transfer tubes are arranged in parallel.

8. An ice thermal storage tank which stores water therein and is provided with a heat transfer tube through which a refrigerant flows in the water, including an inlet-side header and an outlet-side header provided above said ice thermal storage tank so that they are not submerged in the water; and said heat transfer tube in a pipe shape and a plate-shaped fin connected to only one side of said heat transfer tube, said fin being installed vertically, and a plurality of rows of said heat transfer tubes and said fins being arranged.

9. The ice thermal storage tank according to claim 7, wherein said fin has a dimension in the height direction ranging from the bottom of said ice thermal storage tank to the vicinity of the top end of the vessel, said fin being installed vertically, and a plurality of said fins being laminated in the thickness direction.

10. The ice thermal storage tank according to claim 8, wherein said heat transfer tube has a circular cross section having an outside diameter of 7 to 9 mm; said fin has a thickness of 0.3 to 1.0 mm and is installed vertically, and said heat transfer tube and said fin being laminated at an interval of 10 to 50 mm.

11. The ice thermal storage tank according to any one of claims 8 to 10, wherein said fin has a concave portion which is a semicircular groove, and said heat transfer tube is fixed by said concave portion.

12. The ice thermal storage tank according to claim 8, wherein each row of fins and a longitudinal axis of an adjacent row of heat transfer tubes are arranged in parallel.

* * * * *